Figure 1:
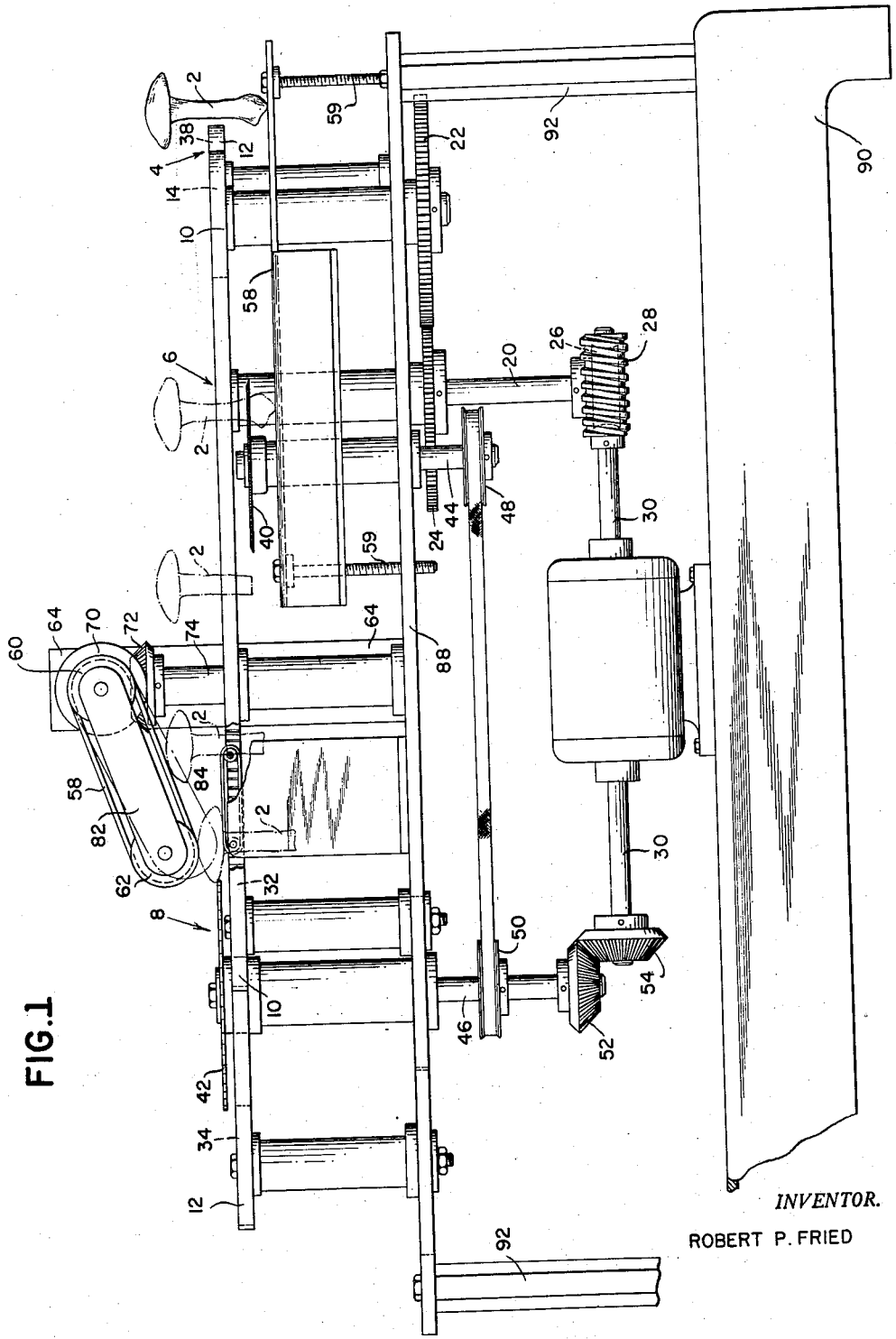

June 3, 1958     R. P. FRIED     2,837,131
MUSHROOM TRIMMER

Filed March 18, 1955                 2 Sheets-Sheet 1

*INVENTOR.*
ROBERT P. FRIED

June 3, 1958  R. P. FRIED  2,837,131
MUSHROOM TRIMMER
Filed March 18, 1955  2 Sheets-Sheet 2

INVENTOR.
ROBERT P. FRIED

United States Patent Office

2,837,131
MUSHROOM TRIMMER

Robert P. Fried, Staatsburg, N. Y.

Application March 18, 1955, Serial No. 495,256

4 Claims. (Cl. 146—81)

This invention relates to a vegetable cutting machine, and in particular to an improved assembly line type vegetable cutting machine wherein a vegetable may be moved in assembly line fashion between a plurality of horizontally displaced stations, and wherein a plurality of cuts be made in the vegetable as it is being transported.

In order to explain the operating features and principles of this invention, it is described as it would be used in preparing mushrooms for canning. Obviously, this description and the use of the term "mushroom cutter" are not intended to limit the scope of this invention to a mushroom cutter.

In preparing mushrooms for canning, a uniform length of the root is cut off, and then the stem and button are separated by a second cut. The length of the stem determines the position of the second cut.

Dial-type mushroom cutters, wherein a mushroom is moved circumferentially from one cutting station to another, are well known in the art; but it has been found that the speed of processing a mushroom on a dial-type machine is limited to the speed at which receiving slots are presented to an operator, and furthermore, the dial-type machines are usually stopped as each receiving slot is presented to the operator (allowing time for insertion) thereby slowing down the processing to an even greater extent. Accordingly, in order to increase the speed of preparing mushrooms for canning, it is a first object of this invention to provide an assembly-line type machine wherein the speed of processing mushrooms is limited only by the dexterity of the operator.

It is a further object of this invention to provide an assembly-line type mushroom cutter wherein a predetermined length of waste root portion is removed from a mushroom at a first cutting station.

It is a further object of this invention to provide an improved mushroom cutter wherein the mushroom is held with its longitudinal axis upright while it is being transported horizontally between a first and second cutting station.

It is a still further object of this invention to provide an improved mushroom cutting machine wherein mushroom stems are gripped between a pair of belts which are rotated in a common horizontal plane to transport the mushroom between cutting stations.

It is a still further object of this invention to provide a device for moving a mushroom vertically while it is being transported horizontally between cutting stations. In this manner, the mushroom button is presented to the cutter at a second cutting station irrespective of the length of the mushroom stem.

Further objects and advantages of this invention will become apparent and will be better understood by reference to the following description and the accompanying drawings, and the features of novelty which characterize this invention will be pointed out with particularity in the claims annexed to and forming part of the specification.

Figure 2:
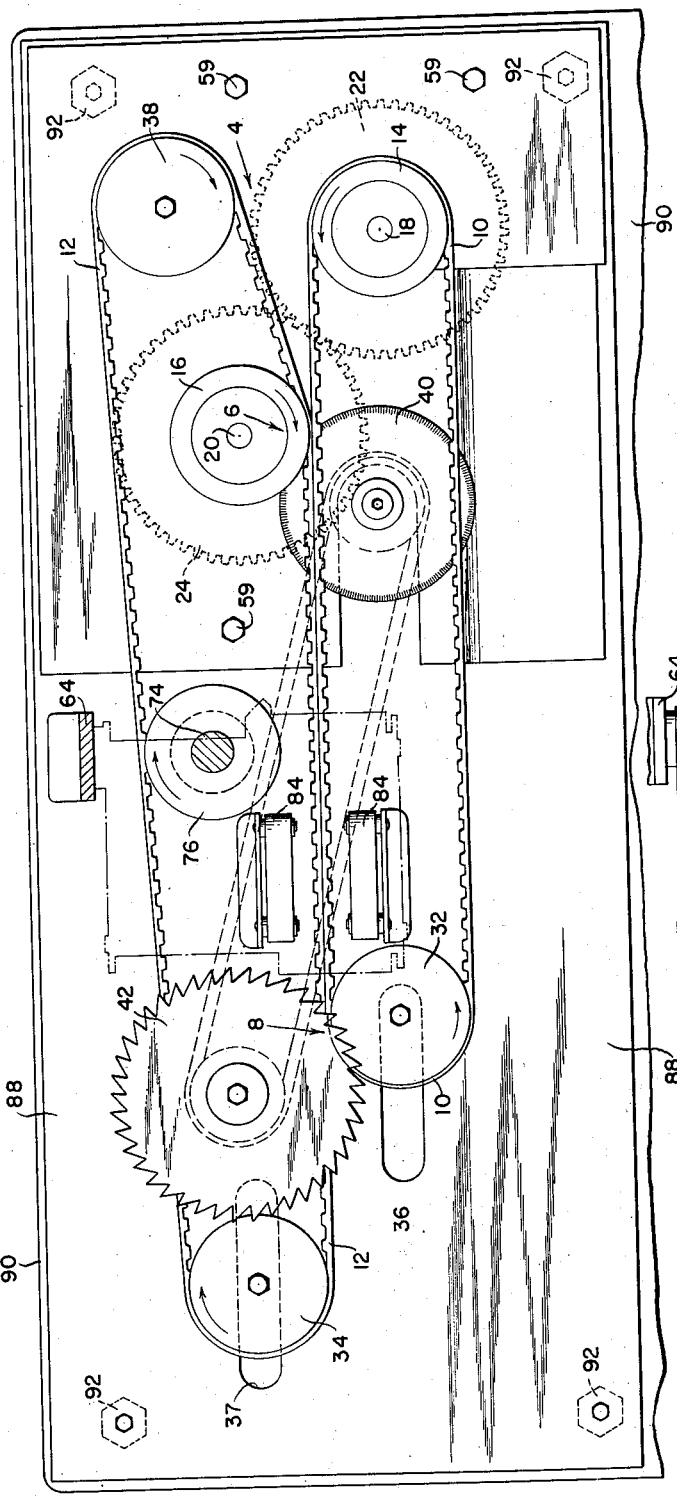
Figure 3:
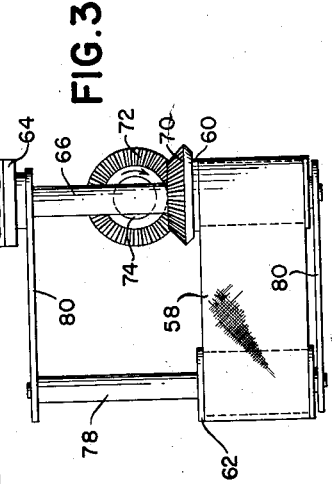

In the drawings, Fig. 1 is a front elevation of an improved vegetable cutting machine; Fig. 2 is a plan view of the cutting machine; while Fig. 3 is a plan view of the device that moves a vegetable vertically while it is being transported horizontally.

Briefly, this invention relates to a vegetable cutting machine of the type wherein a mushroom, for example, is fed between a pair of conveyor belts which grip the mushroom stem to hold its horizontal axis upright while the mushroom is transported horizontally past a plurality of cutting stations. Between stations, the mushroom is displaced vertically (so as to position the button for severing) by a unique vertical shifting device which is arranged in the form of a belt positioned to be inclined to the horizontal belts. The inclined belt is moved at the same rate as the belts carrying the mushrooms; and accordingly, since there is no relative movement between the two belts, the mushroom is pressed gently downward between cutting stations.

Referring to the drawings (and particularly to Fig. 1) a mushroom 2 is shown transported horizontally from a receiving station 4 past a root cutting station 6 to a button cutting station 8. The mushroom is carried by a pair of conveyor belts 10, 12 which lie in horizontal planes in such a manner that a tension is provided between contiguous sides of the two belts to grip the stem of a mushroom, thereby providing transportation means between stations.

The belts, in one embodiment, are driven by a pair of capstans 14, 16 which, in turn, are supported by parallel shafts 18, 20. These shafts, in turn, carry a pair of gears 22, 24. Actually, the shaft 20 passes through the gear 24 (and is connected to it in driving relation) and connected to a worm wheel 26 in mesh with a worm 28 driven by a motor shaft 30. Because of the gear arrangement 22, 24, it is obvious that capstans 14, 16 will be rotating in opposite directions, and accordingly, the belts will be moved so that their contiguous sides will move in the same direction. The gears 22, 24 have the same pitch diameter, and the capstans 14, 16 (of equal diameter) may be either the cog type for driving cog belts, or the well known V-type pulley with corresponding V-belts.

The belts move in a horizontal plane from capstans 14, 16 about capstans or pulleys 32, 34, which are displaced from the pulleys 14, 16. It is important that the capstans or pulleys be located so that a line joining the centers of corresponding pairs (i. e. 14, 16 or 32, 34) is not perpendicular to the path of mushroom travel, because it is necessary that mushrooms of various diameters pass along between the belts; and if the capstans were diagonally opposite, then a mushroom's size would be limited to the peripheral distance between corresponding pairs, otherwise a mushroom would be squeezed in passing between them. By offsetting the capstans, tension can be provided between the belts without damage to the mushroom. It is also desirable to provide an adjusting means for the capstans 32, 34 in the form of slots 36, 37 so that the belt diameter may be changed to vary the tension between the belts.

The belt 12 is further provided with an idler capstan 38 which deflects the path of the belt to provide a V-shaped receiving station 4 for receiving mushrooms of varying diameters.

At the cutting stations 6 and 8, high speed rotary cutting knives 40, 42 are mounted respectively on the shafts 44, 46. The knives are arranged in horizontal planes contiguous the belts 10, 12 so that the belts grip the stem of the mushroom immediately adjacent the place of cut. Each shaft has a pulley 48, 50 secured respectively thereto and the shaft 46, in turn, carries some gear means such as the bevel gear 52, which, in turn, is meshed with a corresponding gear 54 secured to the motor shaft 30.

In order to regulate the depth of cut for removing the root portion of the mushroom 2, a guide plate 58 is provided with conventional adjusting devices (e. g. bolts 59) for moving it vertically to vary the distance between cutting knife 40 and the plate. With a predetermined adjustment; then as a mushroom 2 is fed to the receiving station 4, it is picked up by the belts 10, 12 and transported to the cutting station 6, where the cutting wheel 40 removes the root. As viewed in Fig. 2, the cutting wheel 40 is rotated clockwise, and in removing the root, the force of the cutting knife throws the root out of the way into a suitable receiving receptacle (not shown).

Mushrooms have a varying length, and accordingly, it is necessary, in a mechanism such as the one shown, to provide a means for moving the mushrooms vertically between a first and second cutting station so that the cutting knife 42 at the station 8 will just remove the button from the mushroom stem. Incidentally, the rotation of the knife 42 acts to drive the severed button towards a receiving receptacle while the mushroom stem is held between the belts. Then as the stem reaches the last point of coincidence between the two belts, it is discharged and collected in another receptacle.

In order to move the mushroom vertically between the cutting stations 6 and 8, a belt 58 is mounted on a pair of capstans 60, 62. The capstan 60 is supported in a vertical bracket 64 by a shaft 66, which is further provided with a bevel gear 70 which, in turn, is in mesh with a corresponding gear 72 carried by a shaft 74 which is driven by a capstan 76 via the belt 12. The gearing arrangement is such that the peripheral speed of the belt 58 is substantially identical to that of the belts 10, 12. With this arrangement, relative movement between the belts 58 and 10, 12 is prevented, and accordingly, there is little tendency to tilt the mushroom from its upright position as it is being moved vertically downward by the belt 58.

The capstan 62 is carried by a shaft 78 which is supported for pivotal movement about the shaft 66 by a pair of brackets 80, 82. The shaft 78 may also be biased counterclockwise about shaft 66 via a spring (not shown). Furthermore, idler belts 84 are mounted just above the plane of the top of belts 10, 12 to limit the downward movement of the mushroom so that, irrespective of the size button on the mushroom, the vertical movement between the cutting stations 6, 8 will be just great enough to position the mushroom button in cutting relation with the rotating knife 42.

The elements of this vegetable cutter are obviously supported on some sort of a table 88 which is held above a base 90 by conventional legs 92. Various bearings and bushings are used to support the elements in desired alignment relative to the table 88.

It can be appreciated that it might be desirable in some instances to make several cuts in a stem of a mushroom, or other vegetable for a canning process. If such a result is desired, then by providing a number of additional cutting stations between the cutting stations 6 and 8 and by arranging the belt 58 at a fixed inclination between the stations, it is apparent that by pure geometry, the displacement of the additional cutting stations and the slope of the belt 58 would determine how much is cut from the stem of the mushroom or other vegetable at each cutting station.

While particular embodiments of this invention have been illustrated and described, it will be obvious to those skilled in the art that the various changes and modifications may be made without departing from the invention, and it is intended in the appended claims to cover all such changes and modifications that come within the true spirit and scope of the invention.

What I claim as new and desire to secure by Letters Patent of the United States is:

1. An improved vegetable processing machine comprising conveyor belt means for holding a vegetable with its longitudinal axis upright while transporting it through a predetermined path, said conveyor belt means comprising a pair of endless belts arranged to lie in juxtaposition in a single horizontal plane, pulley means having vertical axes for moving adjacent portions of said belts side by side in transporting a vegetable along said predetermined path, said pulley axes being so located that a line joining the axes of any corresponding pair is not perpendicular to the path of the belts crossing said line whereby resilient radial tension can be provided between contiguous portions of the belts without crushing a vegetable between the peripheries of corresponding pulleys, vertical shaft supported cutter means arranged to lie in a horizontal plane contiguous said belts at a plurality of cutting stations whereby said conveyor belt means grips said vegetable immediately adjacent the place of cut, one of said pulley means being so positioned with respect to a proximate cutter that effective portions of said conveyor belt lie between their axes and in a manner that the radial distance between the axes of said pulley and said proximate cutter is less than the sum of their radii whereby said pulley acts to oppose the cutting force of said cutter and acts as a backstop therefor, adjustable means limiting the vertical displacement of a vegetable as it enters a first cutting station thereby determining the length of vegetable to be severed at a first cutting station, means displacing a vegetable vertically as it is moved between successive stations to present a predetermined length of the vegetable to the cutter means at each succeeding cutting station, said vertical displacing means comprising a belt having its longer diameter inclined to the plane including said conveyor belt means, and means moving said belt at the same rate and direction as the contiguous portions of said conveyor belts whereby a gradual vertical movement is imparted to a vegetable as it passes between said inclined belt and said horizontal belts thereby feeding a vegetable vertically to each succeeding cutting station.

2. An improved vegetable processing machine comprising conveyor belt means for holding a vegetable while transporting it along a predetermined path, said conveyor belt means comprising a pair of endless belts arranged to lie in juxtaposition in a single horizontal plane, a plurality of pairs of pulley means having vertical axes perpendicular to the plane of said conveyor belt means for supporting adjacent portions of said belts side by side in transporting a vegetable along said predetermined path, said pulley axes being so located that a straight line joining the axes of any corresponding pair is not perpendicular to said predetermined belt path whereby resilient radial tension can be provided between contiguous portions of the belts without crushing the vegetable between the peripheries of said corresponding pair of pulleys, vertical shaft supported rotating cutter means arranged to lie in a plane parallel to and substantially adjacent but spaced from that of said conveyor belt means to cooperate with a proximate pulley of one of said corresponding pairs whereby said conveyor belt means grips said vegetable immediately adjacent the place of cut, said proximate pulley being so positioned with respect to said cooperating cutter that effective portions of said conveyor belt means lie between their axes in a manner that the radial distance between them is less than the sum of their respective radii, whereby the periphery of said proximate pulley acts on said conveyor belt means to oppose the cutting force of said cutter to function as a backstop therefor.

3. An improved vegetable processing machine comprising conveyor belt means for holding a vegetable while transporting it along a predetermined path, said conveyor belt means comprising a pair of endless belts arranged to lie in juxtaposition in a single plane, a plurality of pairs of pulley means having axes perpendicular to the plane of said conveyor belt means for supporting adjacent portions of said belts side by side in transporting a vegetable along said predetermined path, said pulley axes being so located that a straight line joining the axes of any corresponding pair is not perpendicular to said predetermined belt path whereby resilient radial tension can be provided between contiguous portions of the belts without crushing the vegetable between the peripheries of said corresponding pair of pulleys, rotating cutter means arranged to lie in a plane parallel to and substantially adjacent but spaced from that of said conveyor belt means to cooperate with a proximate pulley of one of said corresponding pairs whereby said conveyor belt means grips said vegetable immediately adjacent the place of cut, said proximate pulley being so positioned with respect to said cooperating cutter that effective portions of said conveyor belt means lie between their axes in a manner that the radial distance between them is less than the sum of their respective radii, whereby the periphery of said proximate pulley acts on said conveyor belt means to oppose the cutting force of said cutter to function as a backstop therefor.

4. An improved vegetable processing machine comprising conveyor belt means for holding a vegetable with its longitudinal axes transverse to said conveyor belt means while transporting the vegetable through a predetermined path, said conveyor belt means comprising a pair of endless belts arranged to lie in juxtaposition in a single plane, a plurality of pairs of pulley means having axes perpendicular to the plane of said conveyor belt means for supporting adjacent portions of said belts side by side to define said predetermined path, said pulley axes being so located that a line joining the axes of any corresponding pair is not perpendicular to said predetermined path whereby said resilient radial tension can be provided between contiguous portions of the belts without crushing the vegetable between the peripheries of cooperating pulleys of any pair, rotatable cutter means arranged to lie in a plane parallel to that of said conveyor belt means and proximate one of said pulleys whereby said conveyor belts means grips a vegetable immediately adjacent the place of cut, one of said pulleys being so positioned with respect to the proximate cutter that effective portions of said conveyor belt lie between the axes of said cutter and said pulley in a manner that the radial distance between the axes of said pulley and said proximate cutter is less than the sum of their respective radii, whereby said pulley acts to oppose the cutting force of said cutter to provide a backstop therefor, adjustable means limiting the axial displacement of a vegetable as it enters a first cutting station thereby determining the length of vegetable to be severed at said first cutting station, means displacing the vegetable axially as it is moved between successive stations to present a predetermined length of the vegetable to the cutter at each succeeding cutting station, said axial displacing means comprising an endless displacing belt inclined with respect to the plane including said conveyor belt means, and means moving said displacing belt at the same rate and direction as the contiguous portions of said conveyor belt means whereby a gradual axial movement is imparted to a vegetable as it passes between said displacing belt and said conveyor belt means thereby displacing a vegetable axially as it is transported to successive cutting stations.

References Cited in the file of this patent

UNITED STATES PATENTS

| | | |
|---|---|---|
| 1,155,455 | Wegner | Oct. 5, 1915 |
| 1,166,083 | Russell | Dec. 28, 1915 |
| 1,190,303 | Langton | July 11, 1916 |
| 1,306,586 | Duke | June 10, 1919 |
| 2,476,336 | Urschel | July 19, 1949 |
| 2,638,949 | Blevins, Sr., et al. | May 19, 1953 |